United States Patent
Quigley

(10) Patent No.: US 9,705,408 B2
(45) Date of Patent: Jul. 11, 2017

(54) POWER CONVERTER WITH SLEEP/WAKE MODE

(71) Applicant: Microchip Technology Incorporated, Chandler, AZ (US)

(72) Inventor: Thomas Quigley, Newark Valley, NY (US)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 0 days.

(21) Appl. No.: 15/241,993

(22) Filed: Aug. 19, 2016

(65) Prior Publication Data
US 2017/0054376 A1   Feb. 23, 2017

Related U.S. Application Data

(60) Provisional application No. 62/208,123, filed on Aug. 21, 2015.

(51) Int. Cl.
*H02M 3/335* (2006.01)
*H02M 1/36* (2007.01)
*H02M 1/00* (2006.01)

(52) U.S. Cl.
CPC ......... *H02M 3/33507* (2013.01); *H02M 1/36* (2013.01); *H02M 3/33523* (2013.01); *H02M 2001/0032* (2013.01)

(58) Field of Classification Search
CPC ........... H02M 1/36; H02M 2001/0009; H02M 2001/0032
See application file for complete search history.

(56) References Cited

U.S. PATENT DOCUMENTS 4,967,332 A   10/1990   Claydon et al. ................ 363/17
5,498,995 A   3/1996   Szepesi et al. ................ 327/538
(Continued)

FOREIGN PATENT DOCUMENTS

| DE | 102008027054 A1 | 1/2009 | ............ H02M 3/28 |
| EP | 0618665 A2 | 10/1994 | ............ H02M 3/28 |
| EP | 2775602 A2 | 9/2014 | ............ H02M 3/156 |

OTHER PUBLICATIONS

On Semiconductor, "NCP1249A/B + NCP4355B: Very Low No-Load Power Consumption Flyback Converter with Peak Power Excursion Evaluation Board User's Manual," XP055312861, URL: http://www.onsemi.com/pub/Collateral/EVBUM2221-D.pdf, 30 pages, Apr. 30, 2014.

(Continued)

*Primary Examiner* — Fred E Finch, III
*Assistant Examiner* — Yusef Ahmed
(74) *Attorney, Agent, or Firm* — Slayden Grubert Beard PLLC

(57) ABSTRACT

Offline power converters draw very small amounts of power when unloaded or inactive (no load demand), power consumption may be further reduced by allowing the start-up controller and/or secondary-side controller to enter into a sleep mode (functions within the controllers shut down). When the energy storage capacitors for either the start-up controller or the secondary-side controller reach a low state-of-charge, either controller can wake itself and the other controller, thereby allowing the power converter to become active until both energy storage capacitors are refreshed enough for the controllers to go back into a low power sleep mode. This cycle, which draws very little average power from the AC line, continues until the power converter is required to remain awake (operational mode) and deliver power to the load.

17 Claims, 4 Drawing Sheets

(56) References Cited

U.S. PATENT DOCUMENTS

| | | | |
|---|---|---|---|
| 6,456,511 B1 | 9/2002 | Wong | 363/21.13 |
| 6,504,267 B1 | 1/2003 | Giannopoulos | 307/31 |
| 7,746,672 B2 | 6/2010 | Nishikawa | 363/21.16 |
| 9,331,583 B2 | 5/2016 | Zhang et al. | |
| 2002/0006045 A1 | 1/2002 | Shirai et al. | 363/17 |
| 2002/0125867 A1* | 9/2002 | Choo | H02M 3/33561 323/282 |
| 2007/0133234 A1* | 6/2007 | Huynh | H02M 3/33507 363/20 |
| 2008/0259655 A1 | 10/2008 | Wei et al. | 363/21.18 |
| 2008/0265133 A1 | 10/2008 | Sawtell et al. | 250/206 |
| 2009/0010027 A1* | 1/2009 | Nishikawa | H02M 3/33515 363/21.01 |
| 2009/0261790 A1 | 10/2009 | Arduini | 323/266 |
| 2009/0273324 A1 | 11/2009 | Okamoto et al. | 323/282 |
| 2009/0295346 A1 | 12/2009 | Matthews | 323/267 |
| 2009/0295349 A1 | 12/2009 | Tao et al. | 323/282 |
| 2010/0194198 A1 | 8/2010 | Djenguerian et al. | 307/31 |
| 2010/0308875 A1 | 12/2010 | Fitzgerald | 327/142 |
| 2011/0019446 A1 | 1/2011 | Wu et al. | 363/79 |
| 2011/0032732 A1 | 2/2011 | Hsu | 363/21.14 |
| 2011/0075448 A1 | 3/2011 | Melanson | 363/20 |
| 2011/0103104 A1* | 5/2011 | Zhan | H02M 3/33507 363/21.17 |
| 2011/0164437 A1 | 7/2011 | Sun et al. | 363/16 |
| 2011/0305043 A1* | 12/2011 | Matsumoto | H02M 3/33592 363/21.01 |
| 2012/0099345 A1 | 4/2012 | Zhao et al. | 363/21.05 |
| 2012/0139342 A1 | 6/2012 | Bailey et al. | 307/31 |
| 2012/0139477 A1 | 6/2012 | Oglesbee et al. | 320/107 |
| 2012/0230069 A1 | 9/2012 | Tzeng et al. | 363/49 |
| 2012/0243271 A1* | 9/2012 | Berghegger | H02M 3/33507 363/21.15 |
| 2012/0294048 A1 | 11/2012 | Brinlee | 363/21.18 |
| 2013/0016535 A1 | 1/2013 | Berghegger | 363/21.15 |
| 2013/0155728 A1 | 6/2013 | Melanson et al. | 363/21.16 |
| 2013/0229829 A1 | 9/2013 | Zhang et al. | 363/16 |
| 2013/0236203 A1* | 9/2013 | Nakajima | H02M 3/33507 399/88 |
| 2013/0300384 A1 | 11/2013 | Wang et al. | 323/271 |
| 2014/0028095 A1 | 1/2014 | Maru et al. | 307/31 |
| 2014/0140107 A1 | 5/2014 | Chen et al. | 363/21.15 |
| 2014/0160810 A1 | 6/2014 | Zheng | 363/21.17 |
| 2014/0254214 A1 | 9/2014 | Balakrishnan et al. | 363/21.15 |
| 2014/0254215 A1 | 9/2014 | Brinlee et al. | 363/21.15 |
| 2014/0313790 A1 | 10/2014 | Feng et al. | 363/21.02 |
| 2014/0321170 A1 | 10/2014 | Tumasz | 363/21.09 |
| 2014/0369086 A1* | 12/2014 | Hayasaki | G03G 15/80 363/21.14 |
| 2015/0016152 A1* | 1/2015 | Kojima | G03G 15/80 363/21.02 |
| 2015/0124488 A1 | 5/2015 | Dai et al. | 363/17 |
| 2015/0280573 A1* | 10/2015 | Gong | H02M 3/33523 363/21.14 |
| 2015/0280584 A1* | 10/2015 | Gong | H02M 3/33515 363/21.13 |
| 2016/0079878 A1* | 3/2016 | Lin | H02M 3/33592 363/21.14 |
| 2016/0087541 A1 | 3/2016 | Xie et al. | 363/21.06 |
| 2016/0141951 A1 | 5/2016 | Mao et al. | 363/21.02 |
| 2016/0149504 A1 | 5/2016 | Quigley | |
| 2016/0190938 A1* | 6/2016 | Wang | H02M 3/33507 363/21.12 |
| 2016/0352231 A1 | 12/2016 | Quigley | 363/21.03 |
| 2016/0352237 A1 | 12/2016 | Quigley | 363/21.1 |
| 2017/0054376 A1 | 2/2017 | Quigley | |

OTHER PUBLICATIONS

International Search Report and Written Opinion, Application No. PCT/US2016/047949, 15 pages, Nov. 8, 2016.

"IEEE 802.3af PD with Current Mode Switching Regulator," Freescale Semiconductor, Document No. MC34670, URL: http://www.nxp.com/files/analog/doc/data_sheet/MC34670.pdf, 24 pages, Dec. 31, 2006.

Microchip Technology Incorporated, "HV9910C: Universal High-Brightness LED Driver," URL: http://ww1.microchip.com/downloads/en/DeviceDoc/20005323A.pdf, 18 pages, Mar. 25, 2014.

International Search Report and Written Opinion, Application No. PCT/US2015/061769, 13 pages, Mar. 11, 2016.

U.S. Appl. No. 15/168,390, 23 pages, May 31, 2016.

International Search Report and Written Opinion, Application No. PCT/US2016/035139, 13 pages, Aug. 30, 2016.

International Search Report and Written Opinion, Application No. PCT/US2016/035149, 13 pages, Sep. 9, 2016.

U.S. Non-Final Office Action, U.S. Appl. No. 14/945,729, 36 pages, Mar. 29, 2017.

* cited by examiner

POWER CONVERTER WITH SLEEP/WAKE MODE

RELATED PATENT APPLICATIONS

This application claims priority to commonly owned U.S. Provisional Patent Application No. 62/208,123; filed Aug. 21, 2015; and is related to U.S. patent application Ser. No. 14/945,729; filed Nov. 19, 2015; and U.S. Provisional Patent Application No. 62/169,415; filed Jun. 1, 2015; wherein all are hereby incorporated by reference herein for all purposes.

TECHNICAL FIELD

The present disclosure relates to power converters, and, in particular, to efficiently putting the power converter into a low power sleep mode during light-load or no-load conditions and then waking the power converter from the sleep mode when a load requires power therefrom.

BACKGROUND

Power converters, in particular switched-mode AC/DC power converters, typically have unique circuitry to reduce power used during light-load and no-load conditions. A power converter having a low power standby mode may be used to efficiently operate the power converter during light-load and no-load conditions. There are increasingly stringent requirements for offline power converters to draw very small amounts of power when the power converters are unloaded or inactive (no load demand) in a sleep mode.

SUMMARY

Therefore a need exists for reducing power used when a power converter is in a sleep mode.

According to an embodiment, a method for entering and exiting a low power sleep mode in a power converter may comprise the steps of: providing a primary-side energy storage circuit that may comprise a primary-side start-up controller, a power switch coupled to a transformer, and a primary-side energy storage capacitor; providing a secondary-side energy storage circuit that may comprise a secondary-side controller, and a secondary-side energy storage capacitor; coupling the primary-side and secondary-side energy storage circuits through the transformer; controlling the power switch, during start-up, with the primary-side start-up controller until an operating voltage on the secondary-side energy storage capacitor reaches a desired value; and entering into a low power sleep mode, wherein the primary-side and secondary-side circuitry, in a low IQ mode, operates from energy stored in their respective energy storage capacitors, wherein when a respective voltage on either one of the energy storage capacitors may be less than or equal to respective low voltage limits then either the primary-side start-up controller can wake itself or the secondary-side controller can wake itself and the primary-side start-up controller, whereby the primary and secondary energy storage capacitors may be charged until both respective voltages may be greater than their respective low voltage limits.

According to a further embodiment of the method, may comprise the step of entering the primary-side start-up controller into the low power sleep mode after determining that the voltage on the primary-side energy storage capacitor may be greater than a primary-side high voltage limit. According to a further embodiment of the method, may comprise the steps of starting a primary-side high voltage limit timer after determining that the primary-side high voltage limit has been exceeded, and increasing current drawn by the primary-side start-up controller after the primary-side high voltage limit timer has timed out. According to a further embodiment of the method, may comprise the step of entering the secondary-side controller into the low power sleep mode after determining that the primary-side start-up controller may be in the low power sleep mode. According to a further embodiment of the method, the step of determining that the primary-side start-up controller may be in the sleep mode may comprise the step of determining that the power switch may be not switching.

According to a further embodiment of the method, may comprise the step of raising the voltage on the secondary-side energy storage capacitor with the secondary-side controller before it goes into the low power sleep mode. According to a further embodiment of the method, the step of raising the voltage on the secondary-side energy storage capacitor may cause the voltage on the primary-side energy storage capacitor to increase. According to a further embodiment of the method, may comprise the step of entering the primary-side start-up controller into the low power sleep mode after determining that the voltage on the primary-side energy storage capacitor may be greater than a primary-side high voltage limit.

According to a further embodiment of the method, the step of controlling the power switch may comprise the steps of: applying a first DC voltage to the primary-side start-up controller; turning on and off the power switch with the primary-side start-up controller, wherein the first DC voltage and the power switch may be coupled to a primary winding of the transformer, whereby an AC voltage may be produced on a secondary winding of the transformer; rectifying the AC voltage from the secondary winding of the transformer with a second rectifier to provide a second DC voltage for powering the secondary-side controller and a load; and transferring control of the power switch from the start-up controller to the secondary-side controller when the second DC voltage may be at a desired voltage value.

According to another embodiment, a power converter having a low power sleep mode may comprise: a primary-side start-up controller coupled to a first DC voltage; a transformer having primary and secondary windings, wherein the transformer primary winding may be coupled to the first DC voltage; a current measurement circuit for measuring current through the primary winding of the transformer and providing the measured primary winding current to the primary-side start-up controller; a power switch coupled to the transformer primary, and coupled to and controlled by the primary-side start-up controller; a secondary-side rectifier coupled to the transformer secondary winding for providing a second DC voltage; a secondary-side controller coupled to the primary-side start-up controller and the secondary-side rectifier; and the primary-side start-up controller and the secondary-side controller may have low power sleep modes.

According to a further embodiment, when the primary-side start-up controller receives the first DC voltage it may start to control the power switch on and off whereby a current may flow through the transformer primary, an AC voltage may develop across the transformer secondary winding, a DC voltage from the secondary side rectifier may power up the secondary-side controller, and the secondary-side controller may take over control of the power switch from the primary-side start-up controller when the second DC voltage reaches a desired voltage level.

According to a further embodiment, the primary-side start-up controller may enter into the low power sleep mode when a voltage on a primary-side energy storage capacitor may be greater than a primary-side high voltage limit. According to a further embodiment, the secondary-side controller may enter into the low power sleep mode when the primary-side start-up controller may be in the low power sleep mode. According to a further embodiment, the power switch may be not be switching when the primary-side start-up controller may be in the low power sleep mode. According to a further embodiment, the secondary-side controller may raise a voltage on a secondary-side energy storage capacitor before going into the low power sleep mode. According to a further embodiment, when the voltage on the secondary-side energy storage capacitor may raise the voltage on the primary-side energy storage capacitor may also rise, wherein the primary-side start-up controller may detect this rise in voltage on the primary-side energy storage capacitor and may thereby go into the low power sleep mode.

According to a further embodiment, the primary-side start-up controller may comprise: a voltage regulator having an input and an output; internal bias voltage circuits coupled to the voltage regulator output; under and over voltage lockout circuits coupled to the voltage regulator output; a current regulator and logic circuits for generating pulse width modulation (PWM) control signals; a fixed off-time circuit coupled to the logic circuits; a power driver coupled to the logic circuits and providing PWM control signals for control of an external power switch; an external gate command detection circuit coupled to the logic circuits and adapted to receive an external PWM control signal, wherein when the external PWM control signal may be detected the external gate command detection circuit causes control of the external power switch to change from the logic circuits to the external PWM control signal; and first and second voltage comparators having outputs coupled to the internal current regulator and inputs coupled to a current sense input.

According to a further embodiment, a blanking circuit may be coupled between the current sense input and the first and second voltage comparator inputs. According to a further embodiment, the fixed off-time circuit time period may be determined by a capacitance value of a capacitor. According to a further embodiment, the primary-side start-up controller that may comprise an open-loop current regulator and power switch driver. According to a further embodiment, wherein the primary-side start-up controller may be a simple, low cost analog device. According to a further embodiment, the secondary-side controller may be selected from the group consisting of a microcontroller, an analog controller, and a combination analog and digital controller.

BRIEF DESCRIPTION OF THE DRAWINGS

A more complete understanding of the present disclosure may be acquired by referring to the following description taken in conjunction with the accompanying drawings wherein.

Figure 1:
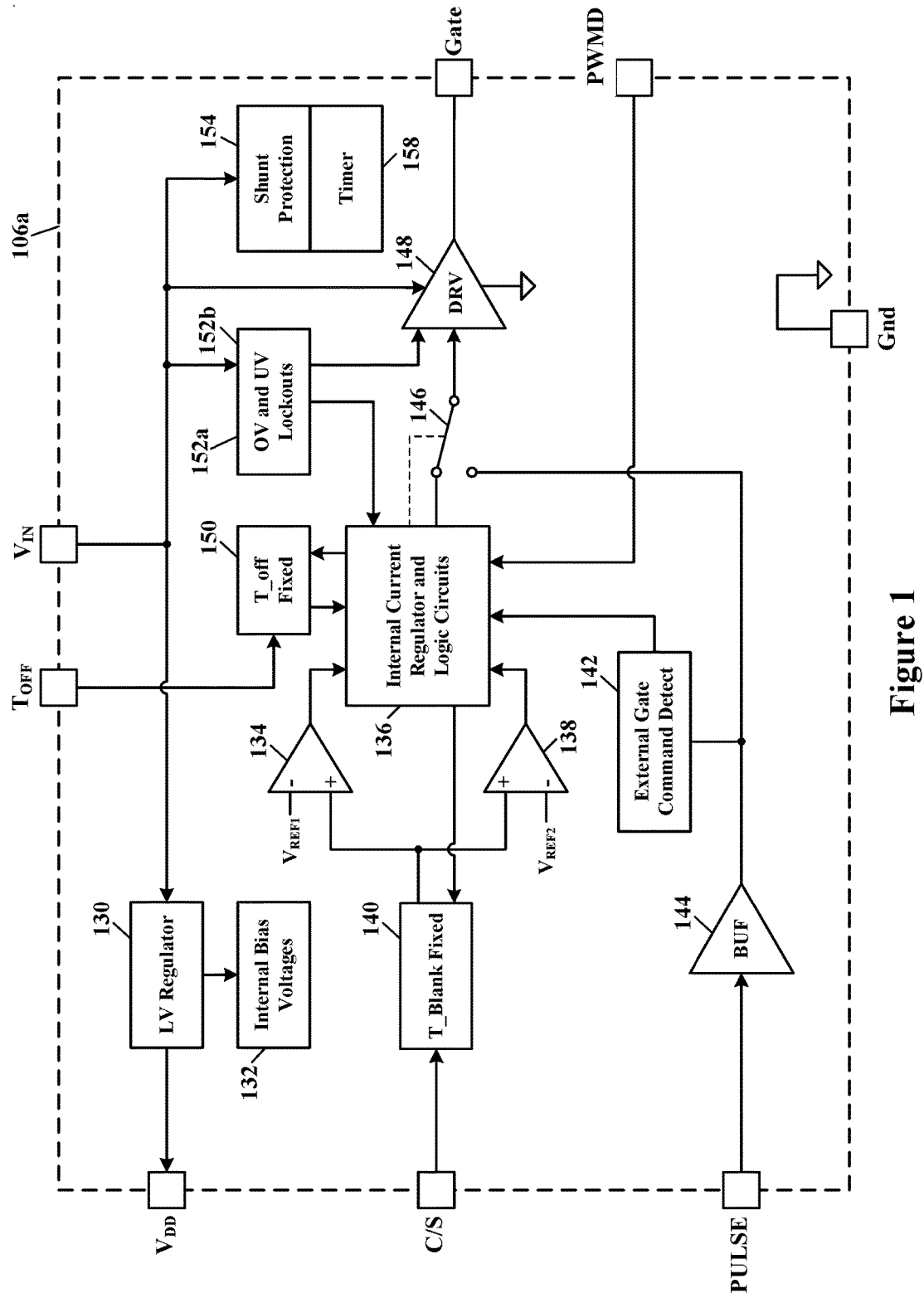
FIG. 1 illustrates a schematic block diagram of a low voltage version of a start-up controller that is adapted for reducing standby power in a power converter, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

DETAILED DESCRIPTION

Power supplies, in particular DC-to-DC and AC-to-DC power converters, typically have unique circuitry to start them up. According to various embodiments of this disclosure, a power converter may comprise a primary-side start-up controller and a secondary-side controller, wherein the start-up controller is utilized to send power to the secondary-side controller when power (voltage) is first applied to the primary side of the power converter. This provides a low cost integrated circuit (IC) solution for start-up of DC-to-DC and AC-to-DC power converters using conventional devices on the primary side that does not duplicate the resources of a secondary-side controller and minimizes discrete components on the primary side. More detailed descriptions of the implementation and operation of power converters, according to the teachings of this disclosure, are provided in commonly owned U.S. patent application Ser. No. 14/945,729; filed Nov. 19, 2015; entitled "Start-Up Controller for a Power Converter," by Thomas Quigley, and is hereby incorporated by reference herein for all purposes.

With the increasingly stringent requirements for offline power converters to draw very small amounts of power when the power converters are unloaded or inactive (no load demand), power consumption may be further reduced by allowing the start-up controller and/or secondary-side controller to enter into a sleep mode (functions within the controllers shut down and therefore draw very low quiescent currents). When the energy storage capacitors for either the start-up controller or the secondary-side controller reach a low state-of-charge, either controller can wake itself and the other controller, thereby allowing the power converter to become active until both energy storage capacitors are refreshed enough for the controllers to go back into a low power sleep mode. This cycle, which draws very little average power from the AC line, continues until the power converter is required to remain awake (operational mode) and deliver power to the load.

According to various embodiments, the start-up controller concept (either the low voltage (LV) or the high voltage (HV) embodiments) is basically a primary-side power switch gate driver that can receive input commands from either an internal open-loop current regulator (default state) or from an outside controller, e.g., secondary-side controller when an external command is detected. Once the external commands cease, and after a time period, the input to the gate driver returns to the default state. In either state the start-up controller protects the power converter against over-currents, and under and over voltages. See "Start-Up Controller for a Power Converter," by Thomas Quigley, Ibid. In addition, under/over voltage detection may be used to further reduce power consumption in the power converter by placing the start-up controller and/or secondary-side controller into a low power sleep mode.

Referring now to the drawings, the details of example embodiments are schematically illustrated. Like elements in the drawings will be represented by like numbers, and similar elements will be represented by like numbers with a different lower case letter suffix.

Referring now to FIG. 1, depicted is a schematic block diagram of a low voltage version of a start-up controller that is adapted for reducing standby power in a power converter, according to a specific example embodiment of this disclosure. The start-up controller 106a may comprise a low voltage regulator 130, internal bias voltage circuits 132, a first voltage comparator 134, a second voltage comparator 138, a fixed blanking time circuit 140, internal current regulator and logic circuits 136, an external gate command detection circuit 142, a signal buffer 144, a switch 146 controlled by the logic circuits 136, a MOSFET driver 148, a fixed off-time timer 150, over and under voltage lockout circuits 152, voltage shunt protection 154, and a shunt timer 158. The under-voltage lockout (UVLO) circuit 152b ensures enough voltage is available to properly enhance the gate of the MOSFET power switch 236 (FIG. 2).

Figure 2:
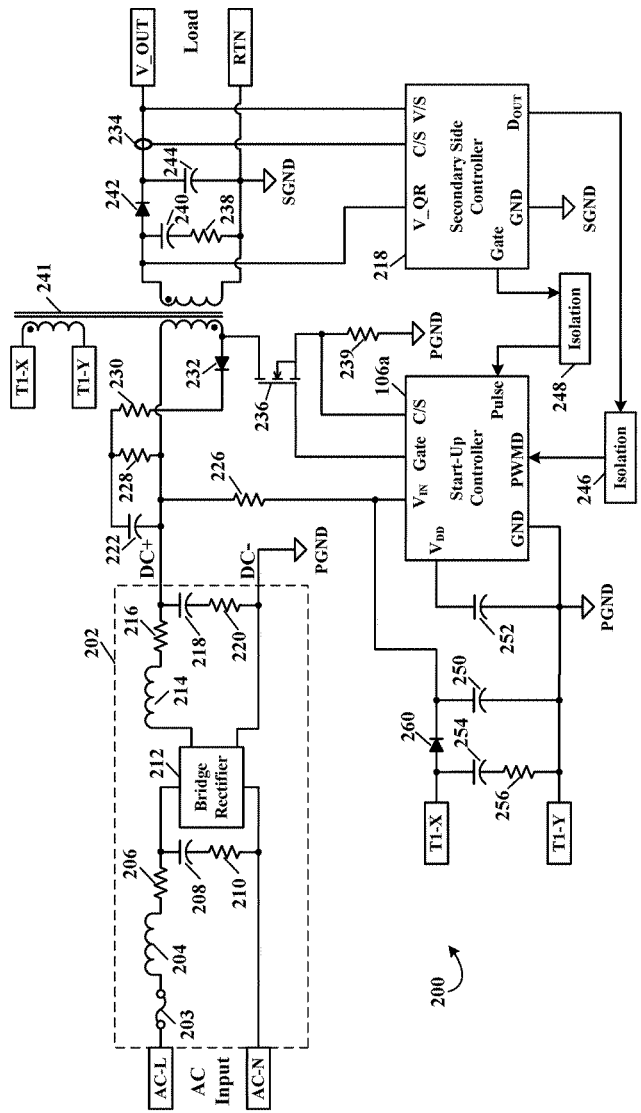
FIG. 2 illustrates a schematic block diagram of a power converter that is adapted for reducing standby power by using the start-up controller shown in FIG. 1, according to a specific example embodiment of this disclosure.

The start-up controller 106a may comprise a pulse width modulation (PWM) source open-loop, peak current-mode controller operating with a fixed OFF-time, and has a MOSFET gate driver 148 adapted to drive a MOSFET power switch 236 on the primary-side of a power converter 200 as shown in FIG. 2. During initial start-up the internal current regulator and logic circuits 136 pulses the MOSFET gate driver 148 which allows the power switch 236 of the power converter 200 to convert energy to its secondary side. The power converter's main controller is located on the secondary side, and when it becomes active it can control the secondary voltage by turning on and off the gate commands to the gate driver 148 of the start-up controller 106a via an isolation circuit 248, e.g., optical-coupler, pulse transformer, etc., coupled to the Pulse node (pin) of the start-up controller 106a. The over and under voltage lockout circuits 152 many have voltage hysteresis values of, for example but are not limited to, 9 to 16 volts. Two current sense comparators 134 and 138 may be provided with internal voltage references $V_{REF1}$ and $V_{REF2}$, respectively.

The node (pin) descriptions for the low voltage version start-up controller 106a are as follows:

$V_{IN}$—is the input voltage to the start-up controller 106a.
Gate—output of the MOSFET gate driver 150. The MOSFET driver 148 may be inhibited by the UVLO circuit 152b.
C/S—current sense, monitors voltage across an external sense resistor. Monitoring may be blanked by the fixed blanking time circuit 140 when the MOSFET driver 148 first turns on the external MOSFET power switch 236.
GND—ground or common for both the signal circuits and a DC return of the MOSFET driver 148.
PWMD—when pulled low inhibits the gate commands from the internal PWM source to the MOSFET gate driver 148.
PULSE—accepts PWM signals from an outside source (secondary-side controller). When PWM signal are detected, internally generated PWM signals are ignored by (inhibited from) the MOSFET gate driver 148.
$V_{IN}$ is the source of bias for the start-up controller 106a. A resistor 226 (FIG. 2) limits the current into the start-up controller 106a. $V_{IN}$ is the input to the low voltage regulator 130 whose output is $V_{DD}$. $V_{IN}$ provides operating bias to the gate driver 148. $V_{IN}$ is monitored by the over-voltage lockout (OVLO) circuit 152a and the under-voltage lockout (UVLO) circuit 152b. $V_{DD}$ provides regulated low-voltage bias to the start-up controller 106a. A shunt protection circuit 154 may be coupled to $V_{IN}$ for protection from over voltages thereto.

Referring now to FIG. 2 depicted is a schematic block diagram of a power converter that is adapted for reducing standby power by using the start-up controller shown in FIG. 1, according to a specific example embodiment of this disclosure. A flyback power converter, generally represented by the numeral 200, may comprise a primary line filter/rectifier 202, capacitors 222, 240, 244, 250, 252 and 254; resistors 226, 228, 230, 238 and 239; diodes 232, 242 and 260; current sensor 234, power switching transistor 236, transformer 241, isolation circuits 246 and 248, start-up controller 106a and secondary side controller 218. The primary line filter/rectifier 202 may comprise a fuse 203, inductors 204 and 214, resistors 206, 210 and 220; capacitors 208 and 218, and diode bridge rectifier 212.

When AC power is applied to the power converter 200 shown in FIG. 2, the start-up controller 106a is in an inactive, low quiescent state. Resistor 226 charges capacitor 250. The UVLO circuit 152b may have a hysteresis band of, for example but is not limited to, about 9 volts to about 16 volts. When $V_{IN}$ reaches 16 volts the start-up controller 106a becomes active and begins driving the power switch 236, e.g., a power metal oxide semiconductor field effect transistor (MOSFET) with the gate driver 148. On the secondary side of the power converter 200, capacitor 244 charges wherein the secondary-side controller 218 will activate at a voltage on its V/S node of about 4.5 volts. The secondary-side controller 218 then begins controlling the gating of the power switch 236 by sending commands via the isolation circuit 248 to the Pulse node of the start-up controller 106a. The secondary-side controller 218 may regulate the voltage on capacitor 244 to about 20 volts. This voltage is transformer-coupled to the primary-side bias winding T1 of transformer 241 and may be used to bootstrap $V_{IN}$ diode 260. The scaling of the transformer T1 windings are such that when the voltage across capacitor 244 is at about 20 volts the voltage at $V_{IN}$ is about 15 volts. Resistor 226 is too high in value to supply the necessary current for the gate driver of the start-up controller 106a. Therefore, this bootstrap voltage must be completed before capacitor 250 discharges below 9 volts.

When the secondary-side controller 218 decides to enter a low power sleep mode it raises the voltage across capacitor 240, which in turn raises the voltage on $V_{IN}$ of the start-up controller 106a. The OVLO circuit 152a may have, for example but is not limited to, a hysteresis band of about 17 volts to about 19 volts. When $V_{IN}$ exceeds 19 volts the OVLO circuit 152a places the start-up controller 106a into a low power sleep mode. The secondary-side controller 218 monitors the voltage on the secondary winding of the transformer 241 at its V_QR input node and thereby can determine that the start-up controller 106a has ceased driving (gating) the power switch 236. Once that happens the secondary-side controller 218 then enters into a low power sleep mode. During its sleep mode the quiescent current (IQ) of the start-up controller 106a is very low, and current through resistor 226 in excess of IQ flows through the Shunt 154. The shunt break-over voltage may be about 21 volts.

There are several ways to wake from the low power sleep mode. One method may be that once the shunt circuit 154 is active a shunt timer 158 may be started. After the time expires, IQ is increased to a current beyond what resistor 226 can supply and capacitor 250 begins to discharge. Once $V_{IN}$ drops below 17 volts the UVLO circuit 152b releases and the start-up controller 106a wakes and starts gating the power switch 236 using its internal current regulator and logic circuits 136. This gating refreshes capacitor 240 and capacitor 250 until $V_{IN}$ exceeds 19 volts again then the start-up controller 106a may reenter the low power sleep mode again. The other method may be that the secondary-side controller 218 may have determined that the voltage across capacitor 240 has dropped below a particular threshold value. When this happens, the secondary-side controller 218 wakes from its sleep mode, and sends a gate pulse via the isolation circuit 248 to the PULSE node (pin) of the start-up controller 106a. The start-up controller 106a detects this pulse and wakes from its sleep mode, whereby its IQ increases which starts the discharging of capacitor 250. When $V_{IN}$ drops below about 17 volts the gating of the power switch 236 begins again. Once the capacitors 244 and 250 are voltage refreshed, the OVLO circuit 152a of the start-up controller 106a may put the start-up controller 106a back into a low power sleep mode ($V_{IN}$ has exceeded 19V). Once the secondary-side controller 218 determines power switch gating has ceased it also returns to a low power sleep mode. If the secondary-side controller 218 decides to stay awake, it sends a signal to the Pulse node (pin) of the start-up controller 106a via the isolation circuit 248 to wake up the start-up controller 106a. Once the OVLO circuit 152a releases, the secondary-side controller 218 may actively regulate the power converter 200 by gating the power switch 236 through the start-up controller 106a.

Figure 3:
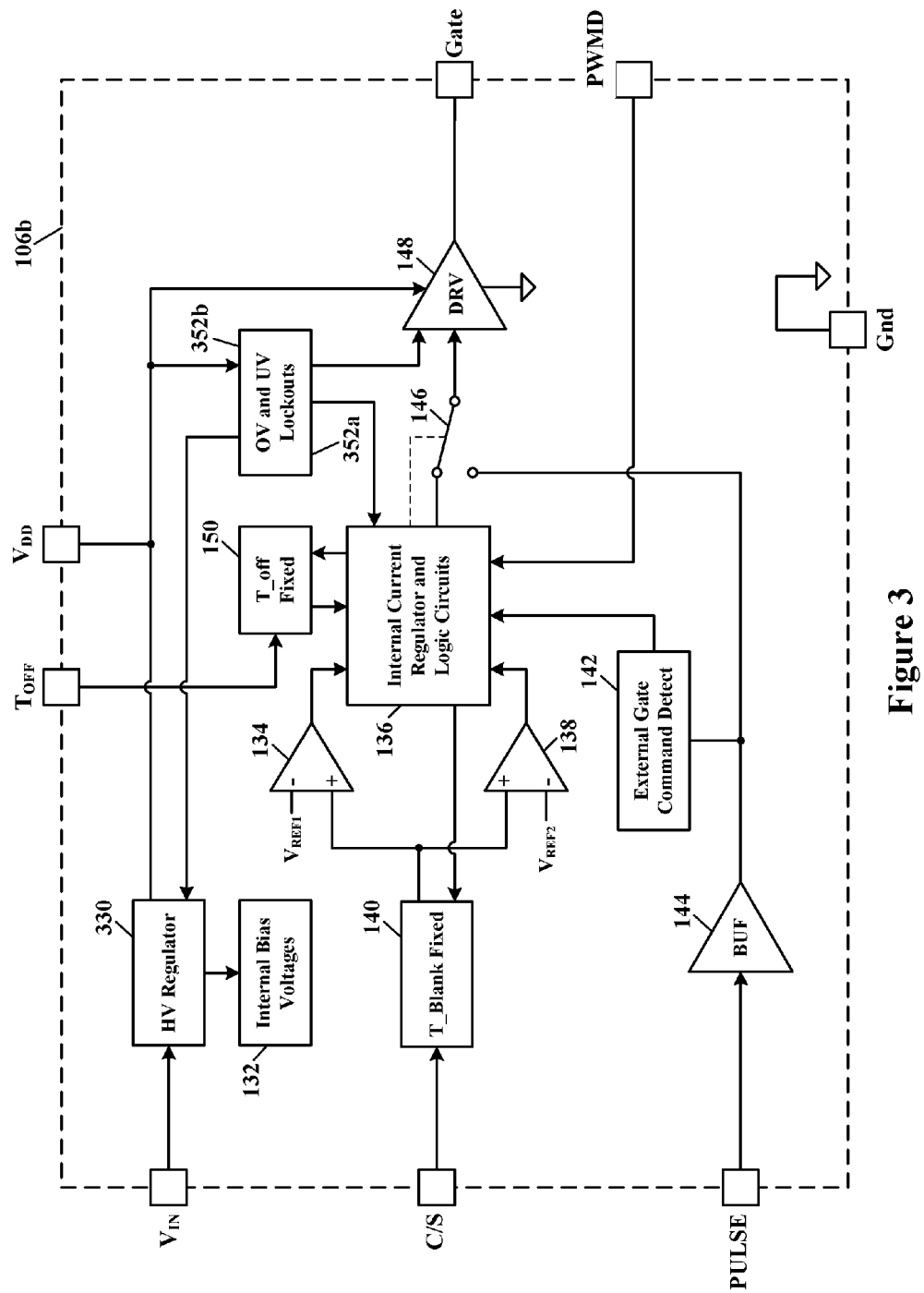
FIG. 3 illustrates a schematic block diagram of a high voltage version of a start-up controller that is adapted for reducing standby power in a power converter, according to another specific example embodiment of this disclosure.

Referring now to FIG. 3, depicted is a schematic block diagram of a high voltage version of a start-up controller that is adapted for reducing standby power in a power converter, according to a specific example embodiment of this disclosure. The start-up controller 106b may comprise a high voltage regulator 330, internal bias voltage circuits 132, a first voltage comparator 134, a second voltage comparator 138, a fixed blanking time circuit 140, internal current regulator and logic circuits 136, an external gate command detection circuit 142, a signal buffer 144, a switch 146 controlled by the logic circuits 136, a MOSFET driver 148, a fixed off-time timer 150, and over and under voltage lockout circuits 352. The under-voltage lockout (UVLO) circuit 352b ensures enough voltage is available to properly enhance the gate of the MOSFET 236 (FIG. 4).

Figure 4:
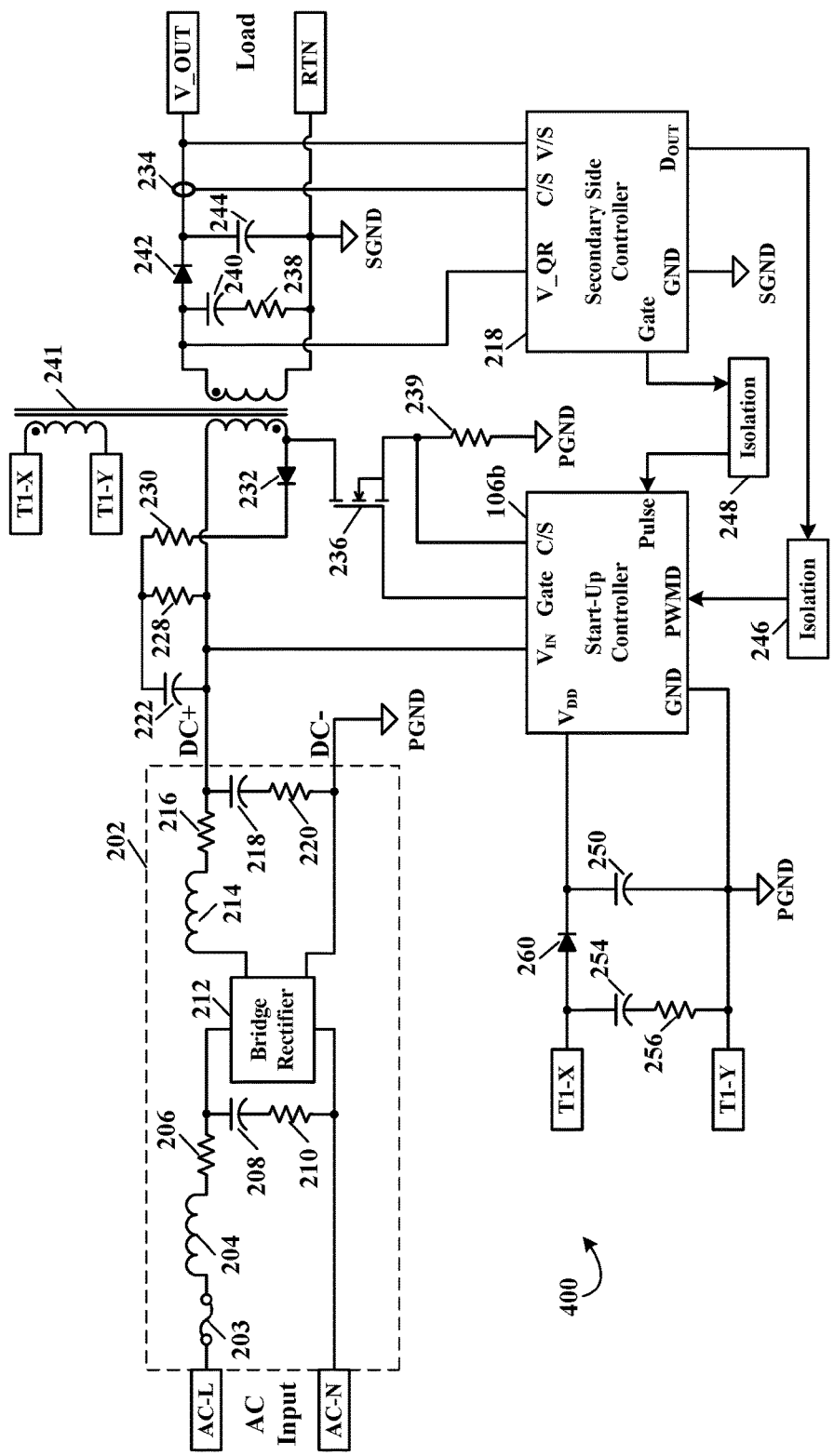
FIG. 4 illustrates a schematic block diagram of a power converter that is adapted for reducing standby power by using the start-up controller shown in FIG. 3, according to another specific example embodiment of this disclosure.

The start-up controller 106b may comprise a pulse width modulation (PWM) source open-loop, peak current-mode controller operating with a fixed OFF-time, and has a MOSFET gate driver 148 adapted to drive a power switch 236 on the primary-side of a power converter 400 as shown in FIG. 4. $V_{IN}$ is the source of initial bias for the start-up controller 106b. $V_{IN}$ may be tied directly to the rectified AC line (DC+, the output of the filter/rectifier block 202) as shown in FIG. 4. $V_{IN}$ is the input to the HV regulator 330 whose output is $V_{DD}$. $V_{DD}$ provides low-voltage bias to the internal circuits of the start-up controller 106b. $V_{DD}$ is also the bias for the gate driver 148 whose output is coupled to the Gate node of start-up controller 106b.

$V_{DD}$ is monitored by the under-voltage lockout (UVLO) circuit 352b and the over-voltage lockout (OVLO) circuit 352a. When AC power is applied to the power converter 400 shown in FIG. 4, the start-up controller 106b is in an inactive, low power quiescent state. $V_{DD}$ charges capacitor 250. The UVLO circuit 352b may have, for example but is not limited to, a hysteresis band of about 9 volts to about 9.5 volts. When $V_{DD}$ reaches 9.5 volts the start-up controller 106b becomes active gating the power switch 236 with commands from its internal current regulator circuit 136. Capacitor 244 charges and the secondary-side controller 218 becomes active at about 4.5 volts. The secondary-side controller 218 then takes over control of gating the power switch 236 by sending pulse commands via isolation circuit 248 to the Pulse node (pin) of the start-up controller 106b. The secondary-side controller regulates the voltage on capacitor 240 to about 20 volts. This voltage is transformer-coupled to the primary-side bias winding T1 that bootstraps $V_{DD}$ via diode 260. The scaling of the T1 winding of transformer 241 is such that when the voltage across capacitor 240 equals about 20 volts the voltage at $V_{IN}$ equals about 15 volts. When $V_{DD}$ is at about 15 volts, it turns off the depletion-mode FET of its HV regulator 330, which in turn causes the current from the rectified AC line to $V_{IN}$ to fall to substantially zero, thereby saving power and heat dissipation in the start-up controller 106b.

When the secondary-side controller 218 decides to enter a low power sleep mode it raises the voltage across capacitor 240, which in turn raises the voltage on $V_{DD}$ of the start-up controller 106b. The OVLO circuit 352a may have, for example but is not limited to, a hysteresis band of about 17 volts to about 19 volts. When $V_{IN}$ exceeds 19 volts the OVLO circuit 352a places the start-up controller 106b into a low power sleep mode. The secondary-side controller 218 monitors the voltage on the secondary winding of the transformer 241 at its V_QR input node and thereby can determine that the start-up controller 106b has ceased driving (gating) the power switch 236. Once that happens the secondary-side controller 218 then enters into a low power sleep mode.

There are several ways to wake from the low power sleep mode. During its sleep mode the quiescent current (IQ) of the start-up controller 106b is very low. One method may be that in sleep mode the $V_{DD}$ of the start-up controller 106b will have a certain low value of IQ, which will slowly discharge capacitor 250. Once $V_{DD}$ drops below 17 volts the UVLO circuit 352b releases and the start-up controller 106b wakes and begins gating the power switch 236 using its internal current regulator and logic circuits 136. This gating refreshes capacitors 240 and 250 until $V_{DD}$ exceeds 19 volts and the start-up controller 106b reenters its low power sleep mode. The other method is that the secondary-side controller 218 may have determined that the voltage across capacitor 240 has dropped below a particular threshold. When this happens, the secondary-side controller 218 wakes, and sends a gate pulse via the isolation circuit 248 to the Pulse node (pin) of the start-up controller 106b. The start-up controller 106b detects this, wakes, and increases its $V_{DD}$ IQ, which starts the discharging of capacitor 250. When $V_{DD}$ drops below 17 volts the gating of the power switch 236 begins again. Once the capacitors 244 and 250 are voltage refreshed, the OVLO circuit 352a of the start-up controller 106b may put the start-up controller 106b back into a low power sleep mode ($V_{IN}$ has exceeded 19V). Once the secondary-side controller 218 determines power switch gating has ceased it also returns to a low power sleep mode. If the secondary-side controller 218 decides to stay awake, it sends a signal to the Pulse node (pin) of the start-up controller 106b via the isolation circuit 248 to wake up the start-up controller 106b. Once the OVLO circuit 352a releases, the secondary-side controller 218 may actively regulate the power converter 400 by gating the power switch 236 through the start-up controller 106b.

The invention claimed is:

1. A method for entering and exiting a low power sleep mode in a power converter, said method comprising the steps of:
   providing a primary-side energy storage circuit comprising
      a primary-side start-up controller,
      a power switch coupled to a transformer, and
      a primary-side energy storage capacitor;
   providing a secondary-side energy storage circuit comprising
      a secondary-side controller, and
      a secondary-side energy storage capacitor;
   coupling the primary-side and secondary-side energy storage circuits through the transformer;
   controlling the power switch, during start-up, with the primary-side start-up controller until an operating voltage on the secondary-side energy storage capacitor reaches a desired value; and
   entering into a low power sleep mode, wherein the primary-side and secondary-side circuitry, in a low IQ mode, operates from energy stored in their respective energy storage capacitors, wherein when a respective voltage on either one of the energy storage capacitors is less than or equal to respective low voltage limits then either the primary-side start-up controller can wake itself or the secondary-side controller can wake itself and can wake the primary-side start-up controller, whereby the primary and secondary energy storage capacitors are charged until both respective voltages are greater than their respective low voltage limits,
   wherein the secondary-side controller raises a voltage on the secondary-side energy storage capacitor before going into the low power sleep mode and when the voltage on the secondary-side energy storage capacitor rises, a voltage on the primary-side energy storage capacitor also rises, wherein the primary-side start-up controller detects this rise in voltage on the primary-side energy storage capacitor and thereby goes into the low power sleep mode.

2. The method according to claim 1, further comprising the step of entering the primary-side start-up controller into the low power sleep mode after determining that the voltage on the primary-side energy storage capacitor is greater than a primary-side high voltage limit.

3. The method according to claim 2, further comprising the steps of starting a primary-side high voltage limit timer after determining that the primary-side high voltage limit has been exceeded, and increasing current drawn by the primary-side start-up controller after the primary-side high voltage limit timer has timed out.

4. The method according to claim 2, further comprising the step of entering the secondary-side controller into the low power sleep mode after determining that the primary-side start-up controller is in the low power sleep mode.

5. The method according to claim 4, wherein the step of determining that the primary-side start-up controller is in the sleep mode comprises the step of determining that the power switch is not switching.

6. The method according to claim 1, wherein the step of controlling the power switch comprises the steps of:
   applying a first DC voltage to the primary-side start-up controller;
   turning on and off the power switch with the primary-side start-up controller, wherein the first DC voltage and the power switch are coupled to a primary winding of the transformer, whereby an AC voltage is produced on a secondary winding of the transformer;
   rectifying the AC voltage from the secondary winding of the transformer with a second rectifier to provide a second DC voltage for powering the secondary-side controller and a load; and
   transferring control of the power switch from the start-up controller to the secondary-side controller when the second DC voltage is at a desired voltage value.

7. A power converter having a low power sleep mode, comprising:
   a primary-side start-up controller coupled to a first DC voltage;
   a transformer having primary and secondary windings, wherein the transformer primary winding is coupled to the first DC voltage;
   a current measurement circuit for measuring current through the primary winding of the transformer and providing the measured primary winding current to the primary-side start-up controller;
   a power switch coupled to the transformer primary, and coupled to and controlled by the primary-side start-up controller;
   a secondary-side rectifier coupled to the transformer secondary winding for providing a second DC voltage;
   a secondary-side controller coupled to the primary-side start-up controller and the secondary-side rectifier; and
   the primary-side start-up controller and the secondary-side controller have low power sleep modes, wherein the secondary-side controller is configured to raise a voltage on a secondary-side energy storage capacitor before going into the low power sleep mode and when the voltage on the secondary-side energy storage capacitor rises, a voltage on a primary-side energy storage capacitor also rises, wherein the primary-side start-up controller is configured to detect this rise in voltage on the primary-side energy storage capacitor and thereby goes into the low power sleep mode.

8. The power converter according to claim 7, wherein:
   when the primary-side start-up controller receives the first DC voltage it starts to control the power switch on and off whereby a current flows through the transformer primary,
   an AC voltage develops across the transformer secondary winding,
   a DC voltage from the secondary side rectifier powers up the secondary-side controller, and
   the secondary-side controller takes over control of the power switch from the primary-side start-up controller when the second DC voltage reaches a desired voltage level.

9. The power converter according to claim 7, wherein the primary-side start-up controller enters into the low power sleep mode when a voltage on a primary-side energy storage capacitor is greater than a primary-side high voltage limit.

10. The power converter according to claim 9, wherein the secondary-side controller enters into the low power sleep mode when the primary-side start-up controller is in the low power sleep mode.

11. The power converter according to claim 10, wherein the power switch is not switching when the primary-side start-up controller is in the low power sleep mode.

12. The power converter according to claim 7, wherein the primary-side start-up controller comprises:
   a voltage regulator having an input and an output;
   internal bias voltage circuits coupled to the voltage regulator output;

under and over voltage lockout circuits coupled to the voltage regulator output;

a current regulator and logic circuits for generating pulse width modulation (PWM) control signals;

a fixed off-time circuit coupled to the logic circuits;

a power driver coupled to the logic circuits and providing PWM control signals for control of an external power switch;

an external gate command detection circuit coupled to the logic circuits and adapted to receive an external PWM control signal, wherein when the external PWM control signal is detected the external gate command detection circuit causes control of the external power switch to change from the logic circuits to the external PWM control signal; and first and second voltage comparators having outputs coupled to the internal current regulator and inputs coupled to a current sense input.

13. The power converter according to claim 12, further comprising a blanking circuit coupled between the current sense input and the first and second voltage comparator inputs.

14. The power converter according to claim 13, wherein the fixed off-time circuit time period is determined by a capacitance value of a capacitor.

15. The power converter according to claim 7, wherein the primary-side start-up controller comprises an open-loop current regulator and power switch driver.

16. The power converter according to claim 7, wherein the primary-side start-up controller is a simple, low cost analog device.

17. The power converter according to claim 7, wherein the secondary-side controller is selected from the group consisting of a microcontroller, an analog controller, and a combination analog and digital controller.

* * * * *